Patented Nov. 20, 1951

2,575,900

UNITED STATES PATENT OFFICE 2,575,900

FILTER

Cecil Gordon Vokes, Guildford, England, assignor to Vokes, Limited, Guildford, England, a British company Application August 13, 1946, Serial No. 690,096
In Great Britain March 16, 1945

4 Claims. (Cl. 210—183)

This invention relates to filters having automatic by-pass arrangements and more particularly to an outside-to-in filter having the by-pass efficiency of an inside-to-out.

A filter construction in extensive use comprises a casing having a header containing the inlet and outlet openings with one of said openings centrally disposed, and a filter cage having a centrally disposed opening in its top, the cage being spring retained against the header with the centrally disposed openings in communication.

This construction may be used as an inside-to-out filter wherein its central openings comprise the inlet and the filter cage may be efficiently displaced by internal pressure to provide a by-pass directly between the inlet and outlet. In this instance the interior of the filter cage is relatively difficult to clean. On the other hand, the construction may be employed as an outside-to-in filter wherein the central opening comprises the outlet and the collected dirt is easily cleaned from the casing and the outside of the filter element. In this instance, the filter cage is not susceptible to inlet pressure for by-passing movement.

The present invention provides an arrangement generally very similar but with the interior of the unit on the clean side and so arranged as to open a substantially annular by-pass valve giving substantially direct access of surrounding incoming unfiltered fluid to a central outlet when the pressure outside the unit exceeds that within it by a predetermined amount (a predetermined back pressure) in such a manner that the outer casing which contains the dust or sludge will for practical purposes be short-circuited.

In the preferred forms, the filter has an enclosing casing formed by a cylindrical body and a header and a filtering unit in the casing, the header having means affording entry of unfiltered fluid to the casing surrounding a central outlet for filtered fluid from the unit, a substantially annular by-pass valve, being spring controlled to open under pre-determined back pressure and lying in substantially the direct path across the top of the unit between the incoming fluid and the central outlet, so that the casing will for practical purposes be short-circuited.

In one form, the arrangement is such as to cause the unit to move bodily away from the outlet, a joint between the unit and the outlet serving as the by-pass valve. In such a form, the preferred method of ensuring that excess back pressure, when the direction of flow is from outside to inside the unit, will move the unit away from the outlet, is suitable to shield an appropriate area of the outer surface of the unit from the external pressure and preferably to subject it to the internal pressure. A flexible shield enclosing a space between an area of the unit and the outer casing or some other suitable abutment surface on the side remote from the outlet will serve to ensure that there is a sufficient resultant pressure tending to move the unit away from the outlet against a retaining spring for such movement to take place when a predetermined back pressure occurs and at the same time the flexibility permits such movement. A flexible fabric sleeve surrounding a compression spring between the bottom of the unit and the bottom of the casing is a preferred form: or the flexible shield could be resilient and might serve also as the spring, for instance a copper bellows surrounding or surrounded by or replacing the compression spring. The shield might itself serve as part of the filter screen, taking for instance the form of a corrugated sleeve of felt or the like similar to that used as the filter screen of the unit.

In another form, a substantially annular by-pass valve is normally held to a seating inside the unit by a control spring inside the unit and opens a corresponding series of apertures in the wall of the unit lying in substantially the direct path between inlet and outlet.

Typical examples of both forms are shown by the accompanying drawings in which.

Figure 1:
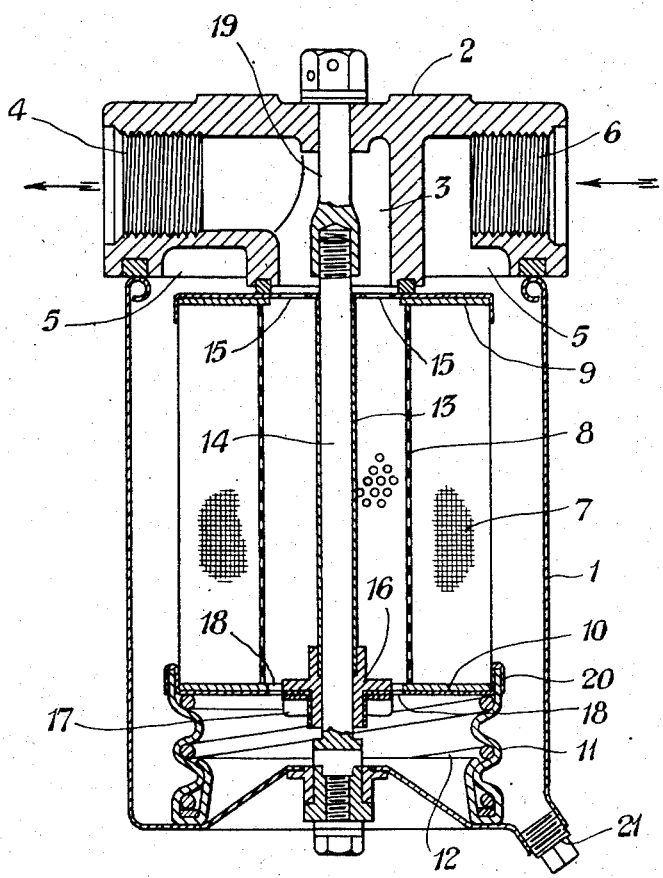
Fig. 1 is a central section of a form in which the unit moves bodily.

In each case, the enclosing casing is formed by a cylindrical body 1 suitably secured to a header 2. The header is formed with a central outlet spigot 3 communicating with a socket 4 for receiving the outlet pipe. The inlet of the unfiltered fluid is from the space 5 surrounding the inlet 3 and communicating with the socket 6 for receiving the inlet pipe. In each case also, the filtering cage is shown as a star-shaped or deeply pleated filtering screen 7 surrounding a perforated metal supporting cylinder 8 and held between upper and lower end caps 9 and 10 which form the top and bottom walls of the filter cage.

Referring now specifically to Fig. 1, a flexible fabric sleeve 11 is shown, surrounding a compression spring 12 between the bottom end cap 10 of the unit and the bottom of the casing 1. The shield 11 is permanently attached to the unit. As shown, the typical cage with a filtering wall 7 of the star-shaped or deeply pleated type has a central tube 13 so that it can slide on a central bolt 14 holding the outer casing 1 to the header 2. The upper end plate 9 of the cage is secured to the top of the tube 13 and has apertures 15 to deliver the fluid to the outlet 3. At the lower end of the tube 13 is a flanged fitting 16 to which the lower end plate 10 is held by a locking nut 17, the lower end plate 10 having apertures 18 into the space beneath. Attached to the rim of the lower end plate by a retaining band 20 is the corrugated felt sleeve 11 enclosing the compression spring 12 so as to make joint with the casing 1 at the bottom. When the casing is removed from the header (possibly by unscrewing an internally threaded captive portion 19 of the assembly bolt 14 from outside the header) the cage can be withdrawn complete with sleeve and spring and dismantled by unscrewing the locking nut 17. Dirt or sludge remain in the bottom of the outer casing and can be discharged when it is removed, or a drain plug may be provided as at 21.

In operation the outside pressure acts upon the portion of the upper end cap 9 outside the outlet 3. The lower end cap 10 is subject to the inside pressure on both sides. When the outside pressure is sufficiently in excess of the inside pressure, the unit will move down against the spring pressure and flow will take place between header inlet 5 and outlet 3, short-circuiting the casing.

Figure 2:
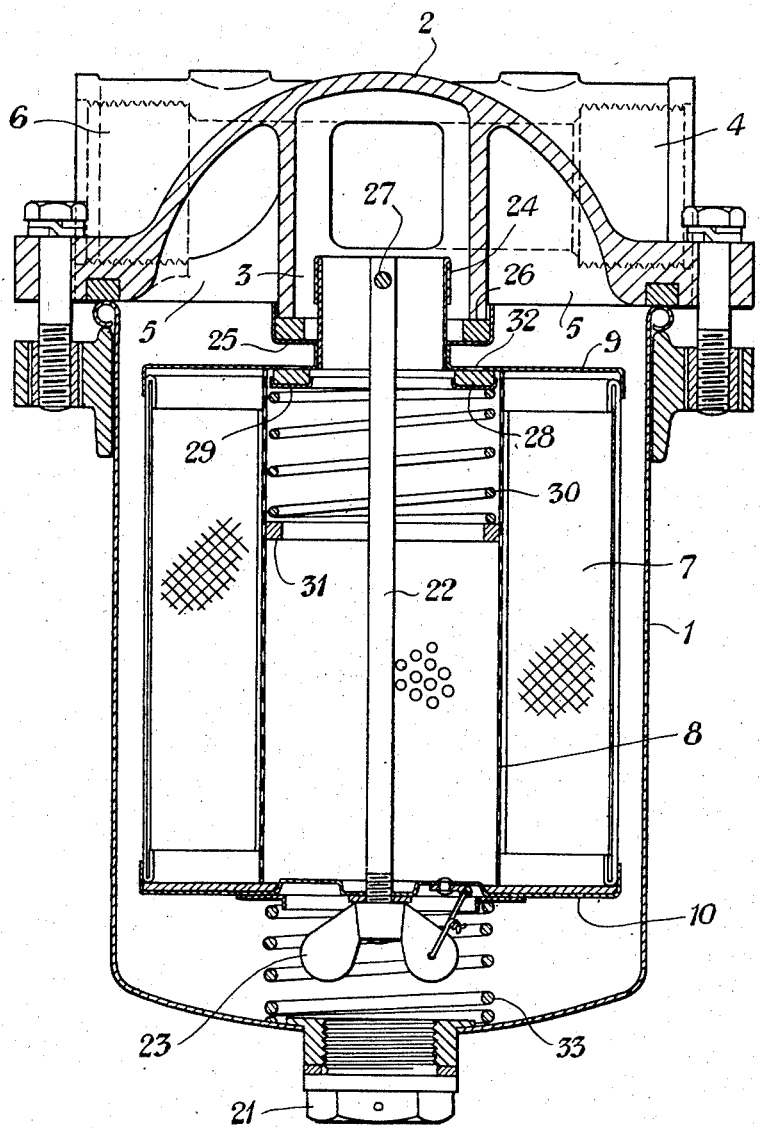
Fig. 2 is a similar view of a form in which an annular valve controls an annular series of apertures in the upper end cap of the unit.

Referring now specifically to Fig. 2, the cage is assembled by a central rod 22 and nut 23. The upper end cap 9 has a neck 24 extending into the outlet 3 and provided with a skirt or flange 25 carrying jointing material 26. The rod 22 is held in the neck 24 by a pin 27. By-pass is effected by movement of the annular valve 28 held to a seating 29 inside the upper end cap 9 of the cage by spring 30, a spring abutment 31 being secured in the interior of the cylinder 8. The valve controls a corresponding annular series of slotted apertures 32 in the upper end cap. The spring 33 is much stronger than the spring 30 and presents a convenient method of quick assembly or removal of the cage, which it holds with the joint 25 firmly seated on the outlet spigot 3.

In operation, when the determined back pressure is reached, the external pressure acting on the valve 28 is sufficiently greater than the pressure inside the cage to move the valve from its seating and by-pass takes place direct from the inlet 5 through the annular series of apertures 32 and up the neck 24 into the outlet 3, thus for practical purposes by-passing the casing 1. A drain plug 21 may be provided.

I claim:

1. A filter unit, comprising a casing having an inlet and an adjacent outlet both in the top wall thereof, a filter cage having top and bottom end walls and an outlet in the top end wall thereof, said cage being mounted in said casing with its outlet aligned with said casing outlet and its top wall extending laterally beyond said casing outlet and subject to inlet pressure, means in said casing for resiliently biasing said cage against the top wall of said casing for direct communication between said cage and casing outlets, and a shield extending between the bottom end wall of said cage and said casing and shielding the bottom of said cage from inlet pressure, whereby said cage may be bodily moved by excessive inlet pressure to bypass across the top of said cage directly between said inlet and casing outlet.

2. A filter unit as defined in claim 1, wherein said shield comprises a compressible sleeve extending between the bottom end wall of said filter cage and the bottom wall of said casing.

3. A filter unit as defined in claim 2, wherein said sleeve comprises flexible material and is secured at one end to the bottom end wall of said filter cage and at the other end to the bottom wall of the casing.

4. A filter unit as defined in claim 1, wherein the means for biasing said cage comprises a coil spring between the bottom of said cage and the casing, and the shield comprises a flexible sleeve surrounding said spring and secured at its upper end to the cage and pressed at its lower end against said casing by said spring.

CECIL GORDON VOKES.

REFERENCES CITED

The following references are of record in the file of this patent:

UNITED STATES PATENTS

| Number | Name | Date |
|---|---|---|
| 765,182 | King | July 19, 1904 |
| 2,186,440 | Williams | Jan. 9, 1940 |
| 2,287,344 | Easton et al. | June 23, 1942 |
| 2,354,380 | Kasten | July 25, 1944 |
| 2,387,368 | Vokes | Oct. 23, 1945 |
| 2,406,308 | Vokes et al. | Aug. 20, 1946 |
| 2,422,647 | Vokes | June 17, 1947 |
| 2,431,782 | Welton | Dec. 2, 1947 |
| 2,439,936 | Kasten | Apr. 20, 1948 |
| 2,524,336 | Vokes | Oct. 3, 1950 |